(12) United States Patent
Kiser

(10) Patent No.: US 9,485,839 B2
(45) Date of Patent: Nov. 1, 2016

(54) PRESSURE ACTIVATED ILLUMINATION APPARATUSES

(71) Applicant: Matthew Paul Kiser, Watkinsville, GA (US)

(72) Inventor: Matthew Paul Kiser, Watkinsville, GA (US)

( * ) Notice: Subject to any disclaimer, the term of this patent is extended or adjusted under 35 U.S.C. 154(b) by 0 days.

(21) Appl. No.: 14/790,718

(22) Filed: Jul. 2, 2015

(65) Prior Publication Data
US 2016/0037610 A1    Feb. 4, 2016

Related U.S. Application Data

(60) Provisional application No. 62/030,250, filed on Jul. 29, 2014.

(51) Int. Cl.
| | |
|---|---|
| H05B 37/00 | (2006.01) |
| H05B 37/02 | (2006.01) |
| F21V 33/00 | (2006.01) |
| H04R 1/02 | (2006.01) |
| H05B 33/08 | (2006.01) |
| F21V 3/02 | (2006.01) |
| F21V 23/04 | (2006.01) |
| F21W 131/30 | (2006.01) |
| F21Y 101/00 | (2016.01) |
| F21Y 105/00 | (2016.01) |

(52) U.S. Cl.
CPC ....... *H05B 37/0227* (2013.01); *F21V 23/0442* (2013.01); *F21V 33/0004* (2013.01); *F21V 33/006* (2013.01); *H04R 1/028* (2013.01); *H05B 33/0842* (2013.01); *F21V 3/02* (2013.01); *F21V 23/0485* (2013.01); *F21W 2131/30* (2013.01); *F21Y 2101/00* (2013.01); *F21Y 2105/00* (2013.01); *F21Y 2113/13* (2016.08); *F21Y 2115/10* (2016.08); *F21Y 2115/15* (2016.08)

(58) Field of Classification Search
CPC .............................. H05B 37/00; H05B 37/02
USPC .......... 315/291, 159, 160, 175, 154; 307/25, 307/64, 66; 362/20, 800, 11, 600, 543
See application file for complete search history.

(56) References Cited

U.S. PATENT DOCUMENTS

| | | |
|---|---|---|
| 6,696,653 B1 | 2/2004 | Smith et al. |
| 6,965,311 B1 | 11/2005 | Karner |
| 2008/0041711 A1 | 2/2008 | Herber |

(Continued)

OTHER PUBLICATIONS

Footfaucet.net. Online Pressure Products. Online on or before Jul. 1, 2014. Retrieved from the Internet Oct. 28, 2015. <URL: http://www.footfaucet.net/FloorMount.htm>.

(Continued)

*Primary Examiner* — Minh D A
(74) *Attorney, Agent, or Firm* — Patentfile, LLC; Bradley C. Fach; Steven R. Kick

(57) ABSTRACT

A pressure activated illumination apparatus is provided. In some embodiments, a pressure activated illumination apparatus may comprise a pressure mat which includes a pressure switch configured to detect weight placed on the pressure mat; an illumination housing which comprises a light emitting element and is movable relative to the pressure mat; and a user control input configured to modulate the illumination of the light emitting element. The pressure mat may be in electrical communication with the illumination housing, and a light emitting element of the illumination housing may be configured to illuminate upon receiving an electrical communication from the pressure mat.

18 Claims, 8 Drawing Sheets

(56) References Cited

U.S. PATENT DOCUMENTS

| | | | |
|---|---|---|---|
| 2008/0080187 A1* | 4/2008 | Purinton | F21K 9/00 362/294 |
| 2010/0231400 A1* | 9/2010 | Von Mohr | A47G 27/0225 340/665 |
| 2011/0133648 A1 | 6/2011 | Melton | |
| 2014/0125232 A1* | 5/2014 | Griffiths | H05B 37/0227 315/154 |
| 2014/0232613 A1* | 8/2014 | Fox | G09G 5/14 345/1.1 |
| 2014/0375434 A1* | 12/2014 | Puljan | F21V 33/004 340/12.5 |

OTHER PUBLICATIONS

Lifehacker.com. Online Instructables user DIYHacks. Online on or before Oct. 11, 2013. Retrieved from Internet Oct. 28, 2015 <URL: http://lifehacker.com/this-diy-pressure-plate-turns-on-the-lights-when-you-wa-1443679631>.

* cited by examiner

PRESSURE ACTIVATED ILLUMINATION APPARATUSES

CROSS REFERENCE TO RELATED APPLICATIONS

This application claims priority to and the benefit of the filing date of U.S. Provisional Application No. 62/030,250, filed on Jul. 29, 2014, entitled "PRESSURE ACTIVATED ILLUMINATION APPARATUSES", which is hereby incorporated by reference in its entirety.

FIELD OF THE INVENTION

The present invention relates to the field of illumination apparatuses. More specifically, the invention relates to pressure activated apparatuses for the selective illumination of toilets, bathrooms, and other areas.

BACKGROUND

Devices for the illumination of selected areas and objects are known in the art and seek to fulfill many needs. One type of need that is ever present is the need for illumination of selected areas when occupants navigate residential areas during night time activities. These activities may include retrieving objects from medicine cabinets, kitchen cupboards, and other like areas. Additionally, night time activities often include using the toilet and sink in a bathroom.

During these night time activities, it is often undesirable to activate over head lighting as other occupants may be awoken by the light. Additionally, guest occupants may be unfamiliar with the location of light switches and their corresponding light locations further increasing the chance of waking other occupants. As a consequence of avoiding using over head lighting, occupants may trip on objects or spend excessive time trying to navigate in the dark leading to difficulty returning to sleep.

One type of device that seeks to address these illumination needs is an always on night light device. These devices typically are constantly illuminated or they may comprise a light sensor allowing them to illuminate when the ambient light falls below a set threshold. These devices are disadvantageous in that the constant light not only may keep occupants awake, but an occupant's night vision may be impeded when moving into un-illuminated areas possibly resulting in collisions and injury. Further to this end, these devices require a constant supply of power which increases energy costs.

Therefore, a need exists for novel apparatuses for the illumination of selected areas and objects. There also exists a need for novel illumination apparatuses that provide illumination of selected areas when occupants navigate residential areas during night time activities. There is a further need for novel illumination apparatuses that do not require occupants to be familiar with the location of light switches and their corresponding light locations. Finally, there exists a need for novel illumination apparatuses that are only activated when an occupant is engaged in an activity that is desired to be illuminated.

BRIEF SUMMARY OF THE INVENTION

A pressure activated illumination apparatus is provided. In some embodiments, a pressure activated illumination apparatus may comprise a pressure mat which includes a pressure switch configured to detect weight placed on the pressure mat; an illumination housing which comprises a light emitting element and is movable relative to the pressure mat; and a user control input configured to modulate the illumination of the light emitting element. The pressure mat may be in electrical communication with the illumination housing, and a light emitting element of the illumination housing may be configured to illuminate upon receiving an electrical communication from the pressure mat.

In further preferred embodiments, an illumination housing may comprise a speaker that may be configured to produce sound upon the illumination housing receiving a signal from the pressure mat. The sounds, loudness, and duration of the sound produced by a speaker may be modulated by one or more user control inputs on the illumination housing.

In yet further preferred embodiments, a wired connection comprising a quick connect and disconnect plug connector may provide wired electrical communication between the pressure mat and the illumination housing.

In still further embodiments, the pressure mat and illumination housing may each comprise a radio, and the pressure mat may be in wireless electrical communication with the illumination housing.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New illumination apparatuses are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
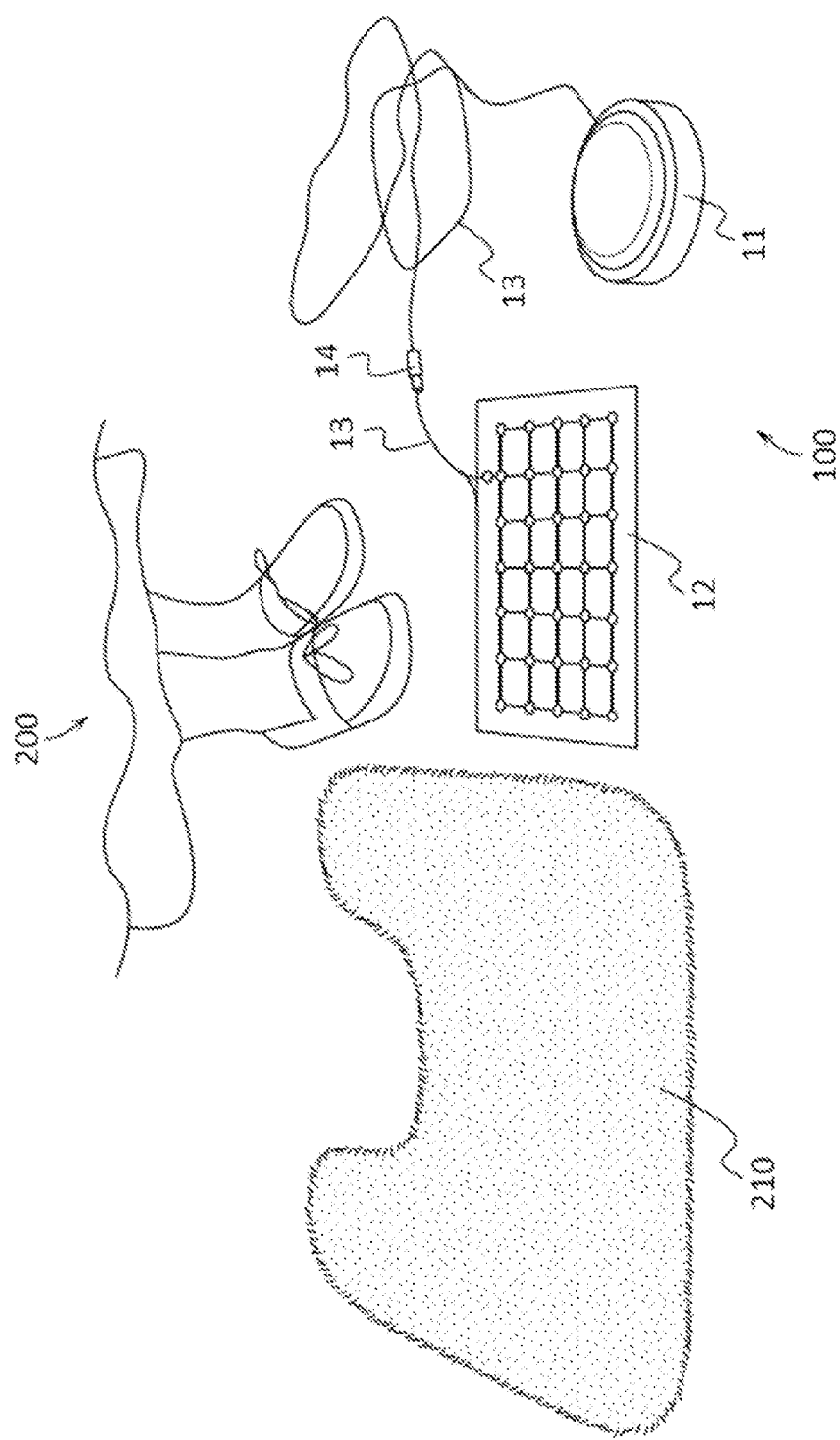
FIG. 1 depicts a top perspective view of an example of a pressure activated illumination apparatus according to various embodiments described herein.

The present invention will now be described by example and through referencing the appended figures representing preferred and alternative embodiments. FIG. 1 illustrates an example of a pressure activated illumination apparatus ("the apparatus") 100 according to various embodiments. In this example, the apparatus 100 comprises an illumination housing 11 and a pressure mat 12 in electrical communication with each other. The illumination housing 11 may comprise a light emitting element 30A which is configured to illuminate, and preferably to illuminate portions of the illumination housing 11. Also in this example, the apparatus 100 comprises a wired connection 13 that may provide electrical communication between an illumination housing 11 and a pressure mat 12. In other embodiments, the pressure mat 12 and illumination housing 11 may each comprise a radio such as one or more Bluetooth radios, Wifi radios, and/or any other radio capable of providing wireless electrical communication between an illumination housing 11 and a pressure mat 12. The illumination housing 11 may be movable relative to the pressure mat 12 with the illumination housing 11 and the pressure mat 12 in wired or wireless electrical communication with each other.

In some embodiments, the apparatus 100 may comprise a wired connection 13 configured to provide electrical communication between the illumination housing 11 and the pressure mat 12. In further embodiments, a wired connection 13 may comprise a quick connect and disconnect plug connector 14 allowing an illumination housing 11 and a pressure mat 12 to be quickly separated for cleaning, repositioning, and other similar activities. Preferably, the quick connect and disconnect plug connector 14 may comprise a water tight gasket or seal to prevent moisture and dirt from disrupting the flow of electricity between an illumination housing 11 and a pressure mat 12 through a wired connection 13.

In some embodiments, the illumination housing 11 may illuminate once a weight above a desired threshold is placed on the pressure mat 12. Also in some embodiments, the pressure mat 12 may be configured to send an electrical communication to the illumination housing 11 once a weight above a desired threshold is placed on the pressure mat 12. An example desired weight threshold may be the weight provided by a user 200 standing on the pressure mat 12. The pressure mat 12 may be configured to detect weight above a desired threshold so that floor coverings 210 such as area rugs, carpets, floor mats, tiles, wood panel flooring, and the like may be placed on top of the pressure mat 12 without activating the pressure mat 12 to illuminate the illumination housing 11. For example, a pressure mat 12 may be configured to illuminate the illumination housing 11 when a weight of approximately twenty pounds or more is placed on the pressure mat 12 allowing a floor covering 210 weighing less than twenty pounds to be placed on the pressure mat 12 without causing the illumination housing 11 to illuminate. In other embodiments, the pressure mat 12 may send a wired signal through the wired connection 13 or a wireless signal to the illumination housing 11 to illuminate once a weight or pressure above one to two hundred pounds is placed on the pressure mat 12. In alternative embodiments, the pressure mat 12 may be placed on any other surface such as on chairs, behind door stops, on stairs, or in any other location where pressure may be applied to a pressure mat 12.

In further embodiments, the apparatus 100 may comprise two, three, four, five, or more pressure mats 12. Additionally, the apparatus 100 may comprise two, three, four, five, or more illumination housings 11 which may be configured to perform other functions in addition to providing illumination.

Figure 2:
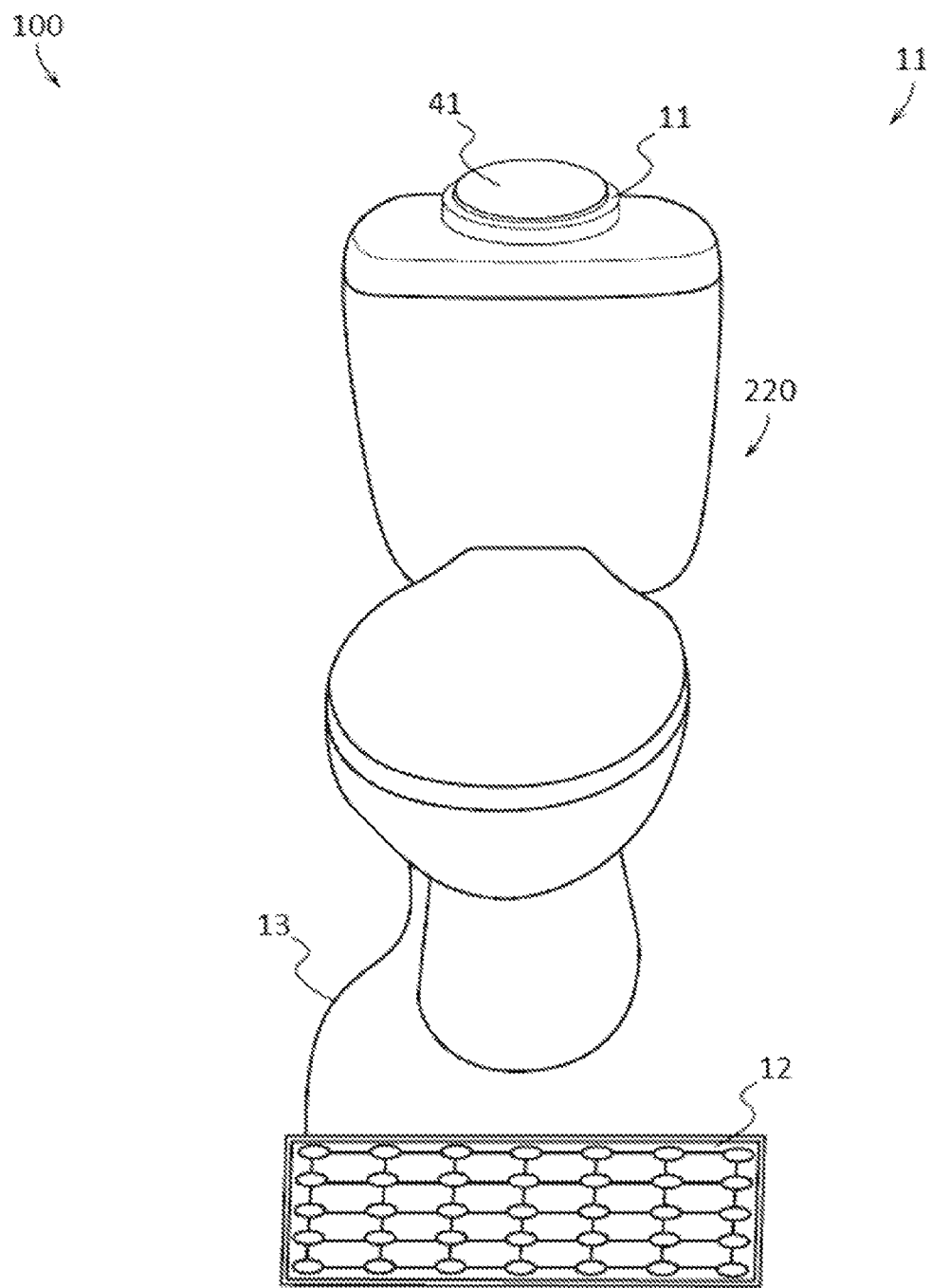
FIG. 2 illustrates a top perspective view of an example of a pressure activated illumination apparatus according to various embodiments described herein.

FIG. 2 illustrates a top perspective view of an example of a pressure activated illumination apparatus 100 according to various embodiments described herein. In this and preferred embodiments, the apparatus 100 may be configured to provide illumination in a bathroom and/or around a toilet 220. In some embodiments, a light emitting element 30A may illuminate to provide illumination in a bathroom and/or around a toilet 220. In further embodiments, a light emitting element 30A may illuminate portions of an illumination housing 11, such as a dome 41, thereby illuminating the illumination housing 11 to provide illumination in a bathroom and/or around a toilet 220. By placing the pressure mat 12 in front of a toilet 220, the illumination housing 11 may be configured to illuminate once a user 210 (FIG. 1) stands on or places one or more of their feet on the pressure mat 12.

In some embodiments, the illumination housing 11 may be configured to provide illumination for a certain time period after a weight above a certain threshold, such as by a user 210 contacting the pressure mat 12, is removed from the pressure mat 12. In further embodiments, a light emitting element 30A may be configured to illuminate, and preferably illuminate portions of the illumination housing 11, for a period of time after the illumination housing 11 receives an electrical communication from the pressure mat 12. For example, the illumination housing 11 may provide illumination for between one and sixty seconds after a user 200 has stepped off of the pressure mat 12. In other embodiments, the illumination housing 11 may provide illumination for between one and five minutes or any other time period after a user 200 has stepped off of the pressure mat 12. In further embodiments, the illumination housing 11 may be configured to provide illumination that dims or fades out at a certain rate once a user 200 has stepped off of the pressure mat 12 or once a certain time period has elapsed after a user 200 has stepped off of the pressure mat 12. In alternative embodiments, the illumination housing 11 may cease to provide illumination once a user 200 has stepped off of the pressure mat 12.

In some embodiments, the illumination housing 11 may comprise a speaker 30B that is configured to produce sound upon the illumination housing 11 receiving an electrical communication from the pressure mat 12. A speaker 30B may be positioned anywhere on the illumination housing 11 and optionally under the dome 41. In some embodiments, a speaker 30B may be configured to produce sound for a period of time after the illumination housing 11 receives an electrical communication from the pressure mat 12 through a wired or wireless electrical communication connection. In further embodiments, the illumination housing 11 may be configured to provide sound in addition to or in place of illumination for a certain time period after pressure above a certain threshold, such as by a user 210 contacting the pressure mat 12, is removed from the pressure mat 12. Sounds such as white noise, nature sounds, music, or any other sound including combinations of sounds may be played to provide an audible alert, to cover up bathroom sounds, to provide a relaxing atmosphere, or for any other purpose. For example, the illumination housing 11 may provide a white noise sound for between one and sixty seconds after a user 200 has stepped off of the pressure mat 12. In other embodiments, the illumination housing 11 may provide sound for between one and five minutes or any other time period after a user 200 has stepped off of the pressure mat 12. In further embodiments, the illumination housing 11 may be configured to provide sound that decreases in volume or fades out at a certain rate once a user 200 has stepped off of the pressure mat 12 or once a certain time period has elapsed after a user 200 has stepped off of the pressure mat 12. In alternative embodiments, the illumination housing 11 may cease to provide sound once a user 200 has stepped off of the pressure mat 12.

Figure 3:
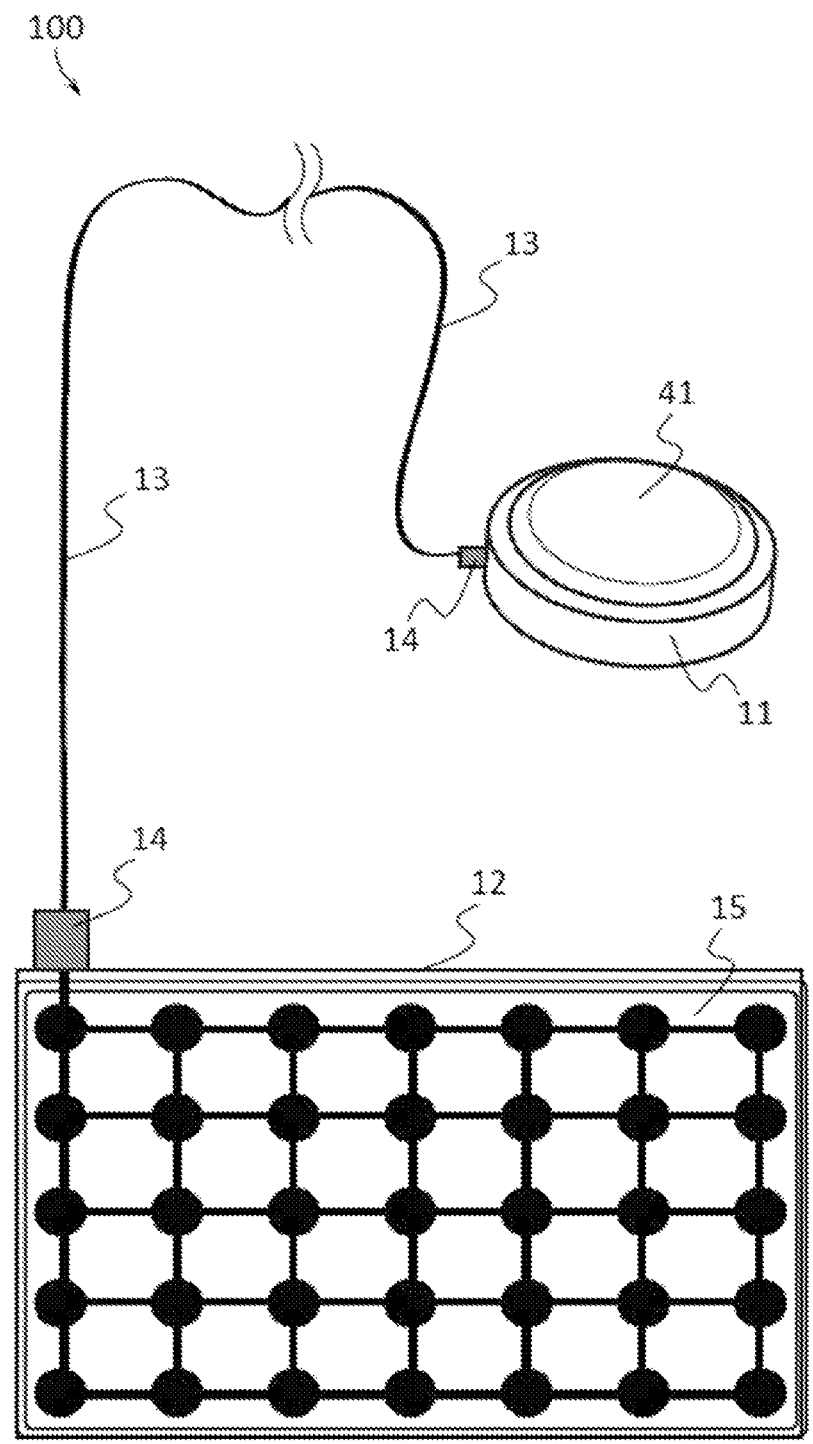
FIG. 3 shows a perspective view of an example of a pressure activated illumination apparatus according to various embodiments described herein.

Turning now to FIG. 3, a perspective view of an example of a pressure activated illumination apparatus 100 according to various embodiments is shown. Preferably, the pressure mat 12, wired connection 13, and illumination housing 11 may all comprise a water tight exterior. In some embodiments, the apparatus 100 may comprise a quick connect and disconnect plug connector 14 that connects the wired connection 13 to a pressure mat 12. In further embodiments, the apparatus 100 may comprise a quick connect and disconnect plug connector 14 that connects the wired connection 13 to an illumination apparatus 11. One or more quick connect and disconnect plug connectors 14 may be positioned anywhere on a wired connection 13, pressure mat 12, and/or illumination housing 11. The quick connect and disconnect plug connector 14 may comprise a 3.5 mm connection, a 2.5 mm connection, a RJ45 connector, a RJ11 connector, or any other suitable wired connector capable of temporarily securing two or more wires in electrical communication with each other. In further embodiments, the wired connection 13 may not comprise a quick connect and disconnect plug connector 14 so that a pressure mat 12 and an illumination housing may be permanently wired together.

The wired connection 13 may be of any length allowing a pressure mat 12 and an illumination housing 11, in embodiments that comprise a wired connection 13, to be positioned at various distances and locations relative to each other. The wired connection 13 may comprise any number of individual wires bound together or generally secured together. The individual wires of a wired connection 13 may be insulated and of any gauge commonly used to carry electricity in typical household appliances that are powered by AC and DC electric power sources 30D.

Figure 4:
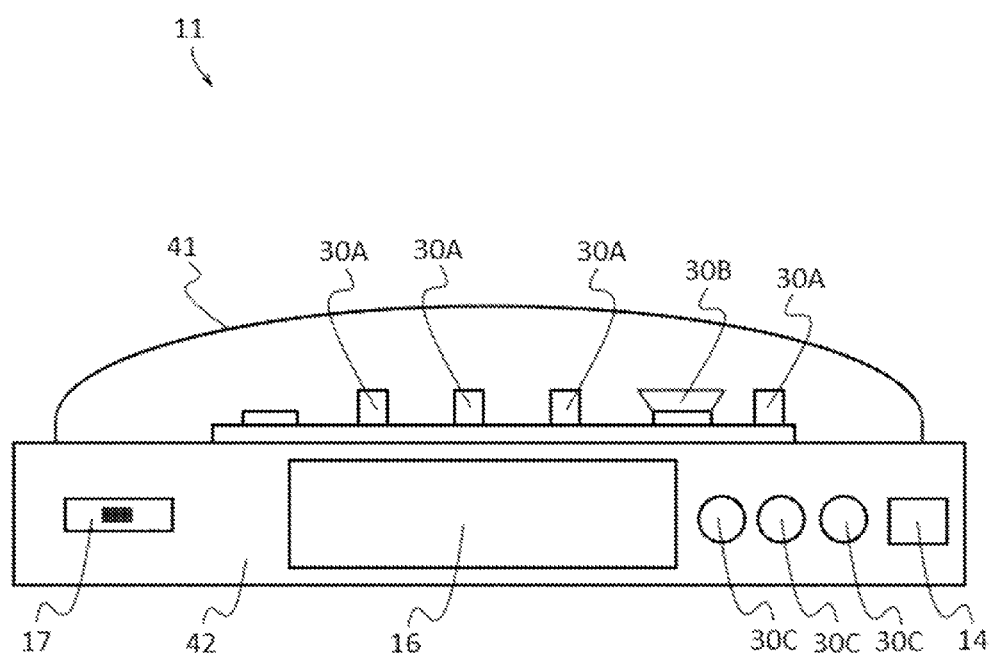
FIG. 4 depicts an elevation view of an illumination housing according to various embodiments described herein.
Figure 5:
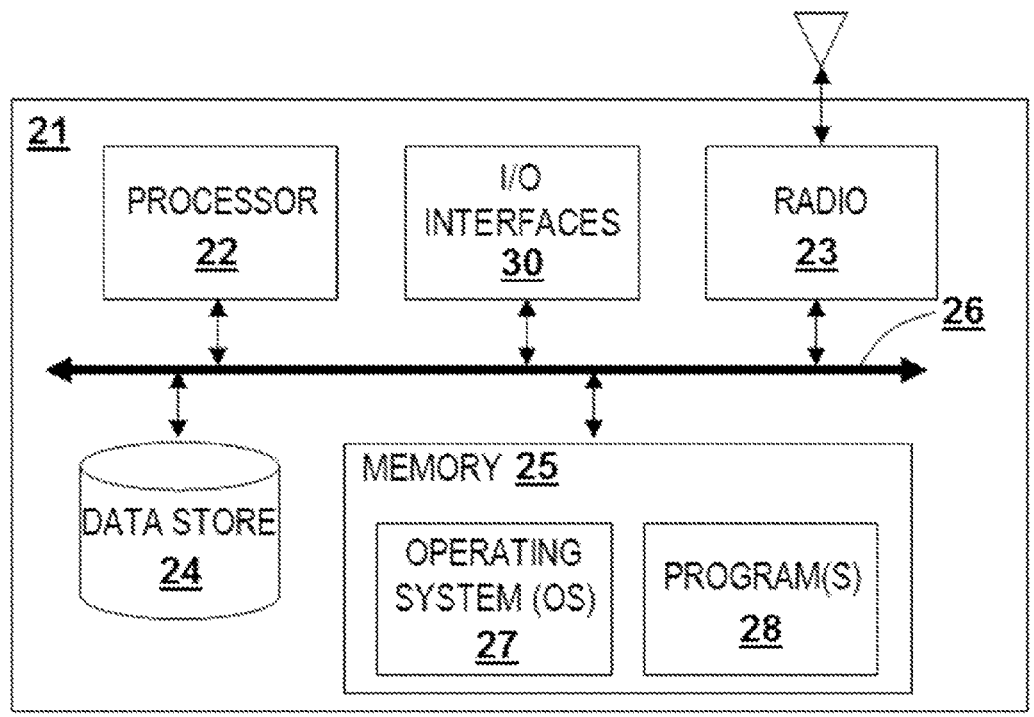
FIG. 5 illustrates a block diagram showing some of the elements of an example of a processing unit according to various embodiments described herein.
Figure 6:
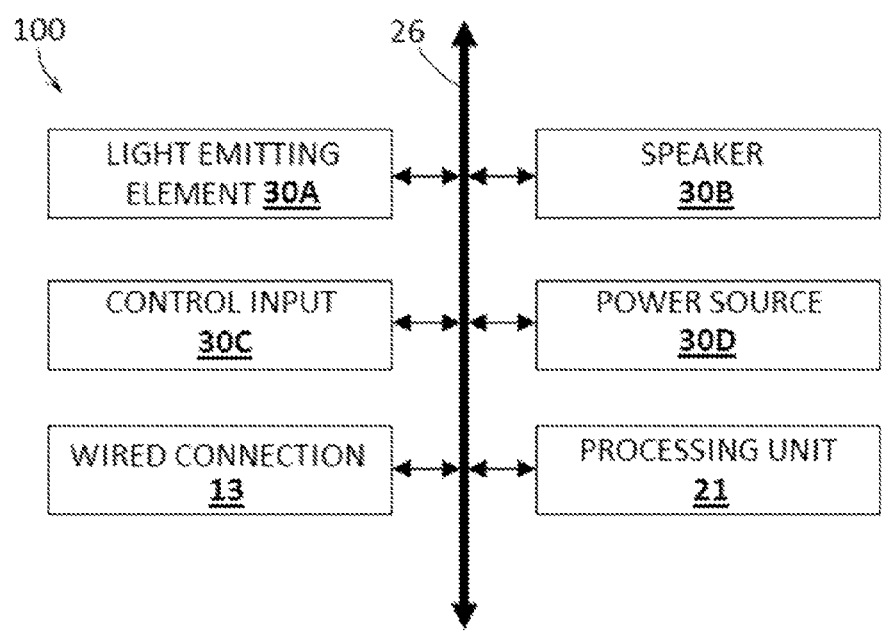
FIG. 6 shows a block diagram showing some example elements which may be in electrical communication with a processing unit according to various embodiments described herein.

Turning now to FIGS. 4-6, some example components of an illumination housing 11 are illustrated according to various embodiments described herein. In some embodiments and in the present example, the apparatus 100 can be a digital device that, in terms of hardware architecture, comprises a processing unit 21 which generally includes a processor 22, input/output (I/O) interfaces 30, an optional radio 23, a data store 24, and memory 25. It should be appreciated by those of ordinary skill in the art that FIG. 5 depicts some example components of the apparatus 100 in an oversimplified manner, and a practical embodiment may include additional components or elements and suitably configured processing logic to support known or conventional operating features that are not described in detail herein. The components and elements (30A, 30B, 30C, 30D, 13, 21, 22, 30, 23, 24, and 25) are communicatively coupled via a local interface 26. The local interface 26 can be, for example but not limited to, one or more buses or other wired or wireless connections, as is known in the art. The local interface 26 can have additional elements, which are omitted for simplicity, such as controllers, buffers (caches), drivers, repeaters, and receivers, among many others, to enable communications. Further, the local interface 26 may include address, control, and/or data connections to enable appropriate communications among the aforementioned components.

The processor 22 is a hardware device for executing software instructions. The processor 22 can be any custom made or commercially available processor, a central processing unit (CPU), an auxiliary processor among several processors associated with the processing unit 21, a semiconductor-based microprocessor (in the form of a microchip or chip set), or generally any device for executing software instructions. When the processing unit 21 is in operation, the processor 22 is configured to execute software stored within the memory 25, to communicate data to and from the memory 25, and to generally control operations of the apparatus 100 pursuant to the software instructions. In an exemplary embodiment, the processor 22 may include a mobile optimized processor such as optimized for power consumption and mobile applications. The I/O interfaces 30 may include a control input 30C, a light emitting element 30A, and/or an optional speaker 30B. The I/O interfaces 30 can also include, for example, a serial port, a parallel port, a small computer system interface (SCSI), an infrared (IR) interface, a radio frequency (RF) interface, a universal serial bus (USB) interface, and the like.

An optional radio 23 enables wireless communication to a pressure mat 12 which also comprises an optional radio 23. In some embodiments, a radio 23 of the illumination housing 11 and a radio 23 of a pressure mat 12 may provide wireless electrical communication between the pressure mat 12 and the illumination housing 11 using a Bluetooth communication protocol. In some embodiments, a radio 23 of the illumination housing 11 and a radio 23 of a pressure mat 12 may provide wireless electrical communication between the pressure mat 12 and the illumination housing 11 using a WiFi communication protocol. Any number of suitable wireless data communication protocols, techniques, or methodologies can be supported by the radio 23, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 24 may be used to store data. The data store 24 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 24 may incorporate electronic, magnetic, optical, and/or other types of storage media.

The memory 25 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 25 may incorporate electronic, magnetic, optical, and/or other types of storage media. Note that the memory 25 may have a distributed architecture, where various components are situated remotely from one another, but can be accessed by the processor 22. The software in memory 25 can include one or more software programs, each of which includes an ordered listing of executable instructions for implementing logical functions. In the example of FIG. 4, the software in the memory system 25 includes a suitable operating system (O/S) 27 and programs 28. The operating system 27 essentially controls the execution of input/output interface 30 functions, and provides scheduling, input-output control, file and data management, memory management, and communication control and related services. The operating system 27 may be, for example, LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 28 may include various applications, add-ons, etc. configured to provide end user functionality with the apparatus 100. For example, exemplary programs 28 may include, but not limited to, environmental variable analytics and modulation of input/output interface 30 functions. In a typical example, the end user typically uses one or more of the programs 28 to modulate light emitted by a light emitting element 30A and modulate sound produced by one or more speakers 30B.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The processing unit 21 may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by the processor 22. In addition, the main memory may be used for storing temporary variables or other intermediate information during the execution of instructions by the processor 22. The processing unit 21 may further include a read only memory (ROM) or other static storage device (e.g., programmable ROM (PROM), erasable PROM (EPROM), and electrically erasable PROM (EEPROM)) coupled to the bus for storing static information and instructions for the processor 22.

In preferred embodiments, the illumination housing 11 may comprise one or more light emitting elements 30A, such as light emitting diodes (LEDs) or other light emitting elements, located anywhere in or on the illumination housing 11, wired connection 13 (FIGS. 1-3, and 5), and/or on the pressure mat 12 (FIGS. 1-3, and 5). One or more of the light emitting elements 30A may be configured to illuminate with various colors and intensities of light allowing a plurality of color patterns and intensity patterns to be generated.

In some embodiments, the light emitting elements 30A may comprise organic light emitting diodes (OLEDs), flexible LED, LED ring, OLED, AMOLED, Super AMOLED, PMOLED, Transparent OLED, Top-emitting OLED, foldable OLED, white OLED. In further embodiments, any type of light emitting element or device such as incandescent light bulbs, halogen light bulbs, laser light emitters, electroluminescent light source, neon light source, or any other suitable light source may be used. Once pressure above a desired threshold is placed on the pressure mat 12, in preferred embodiments, a microcontroller or LED driver may illuminate one or more LED light emitting elements 30A or other light elements. A microcontroller or LED driver may comprise a small computer on a single integrated circuit or chip containing a processor core, memory, and programmable input/output peripherals. Program memory in the form of NOR flash or OTP ROM is may be included on chip, as well as a typically small amount of RAM. In other embodiments, other controllers designed for embedded applications may be used to illuminate the light emitting elements 30A.

Also in preferred embodiments, the illumination housing 11 may comprise a circuit board which may provide electrical communication between one or more components of the illumination housing 11 such as one or more LED light emitting elements 30A, optional speakers 30B, user control inputs 30C, AC or DC power sources 30D, power switches 17, an optional wired connection 13 which may provide electrical communication between the illumination housing and pressure mat 12, and/or an optional radio which may provide electrical communication between the illumination housing and an optional radio in the pressure mat 12. A circuit board may comprise a printed circuit board (PCB) which mechanically supports and electrically connects electronic components using conductive tracks, pads and other features etched from copper sheets laminated onto a non-conductive substrate. PCBs can be single sided (one copper layer), double sided (two copper layers) or multi-layer. Conductors on different layers may be connected with plated-through holes called vias. In some embodiments, a circuit board may only comprise copper connections and no embedded components and may be called a printed wiring board (PWB) or etched wiring board. In other embodiments, a circuit board may comprise a printed circuit assembly (PCA), printed circuit board assembly or PCB assembly (PCBA), a circuit card assembly (CCA), or a backplane assembly, or any other suitable electrical connection and communication method including standard wiring and the like.

In some embodiments the illumination housing 11 may comprise a battery compartment 16 configured to receive and secure a battery or other DC power source 30D. In other embodiments, the illumination housing 11 may be powered by an AC power source 30D and comprise a power cord that is able to be plugged into a power outlet. The AC or DC power sources 30D may provide power to a circuit board and other electrical components, such as a light emitting element 30A, a speaker 30B, a user control input 30C, and the pressure mat 12 through a wired connection 13 or other wired connections.

The illumination housing 11 may comprise one or more user control inputs 30C such as turnable control knobs, depressable button type switches, slide type switches, rocker type switches, or any other suitable input that may be used to modulate electricity between light emitting element 30A, speakers 30B, AC or DC power sources 30D, and/or power switches 17. The user control inputs 30C may be configured to modulate the illumination intensity and illumination color of light emitting element 30A and other lighting elements, the illumination duration period of light emitting elements 30A and other lighting elements, the sounds and volumes of sounds produced by a speaker 30B, and the sound duration period produced by a speaker 30B. In further embodiments, a user control input 30C may be configured to modulate, such as to increase or decrease, the period of time that a light emitting element 30A illuminates once the illumination housing 11 receives an electrical communication from the pressure mat 12. In further embodiments, a user control input 30C may be configured to modulate the period of time that a speaker 30B produces sound once the illumination housing 11 receives an electrical communication from the pressure mat 12.

Also in preferred embodiments, the illumination housing 11 may comprise one or more translucent or transparent domes 41 which may be attached to the illumination housing base 42. In some embodiments, a dome 41 may attach over a light emitting element 15 to the illumination housing base 42, thereby covering the light emitting element 15. In further embodiments, the dome 41 may cover a light emitting element 15 allowing the dome 41 to be illuminated by the light emitting element 15. In preferred embodiments, the dome 41 may be interchangeable allowing different domes comprising various colors and shaped to be temporarily attached to an illumination housing base 42. The dome 41 may provide a sealable covering to prevent dirt and moisture from reaching the electrical components of the illumination housing 11. Preferably, the dome 41 may be made from clear materials, transparent colored materials, and/or frosted or translucent materials, colored translucent materials such as plastics, glass, resins, or any other suitable material capable of allowing various amounts and colors of light to pass through. In further embodiments, one or more designs or pictures may be placed on or applied to a dome 41.

A dome 41 may be temporarily joined to an illumination housing base 42 by being press fit or snap fit together, by one or more fasteners such as Velcro type fasteners, sealable tongue and groove fasteners, clip type fasteners, clasp type fasteners, ratchet type fasteners, threaded type fasteners such as screws and bolts, buckle type fasteners and the like, or any other suitable joining method capable of temporarily securing portions of a dome 41 to an illumination housing base 42. In other embodiments, a dome 41 may be substantially permanently joined to a illumination housing base 42 with heat bonding, chemical bonding, adhesives, clasp type fasteners, clip type fasteners, rivet type fasteners, threaded type fasteners, other types of fasteners, by being integrally molded or formed together, or any other suitable joining method capable of substantially permanently securing portions of a dome 41 to an illumination housing base 42.

It should be understood to one of ordinary skill in the art that a dome 41 and an illumination housing base 42 may be configured in a plurality of sizes and shapes including globular shaped, star shaped, square shaped, rectangular shaped, cylinder shaped, cuboid shaped, hexagonal prism shaped, triangular prism shaped, or any other geometric or non-geometric shape. It is not intended herein to mention all the possible alternatives, equivalent forms or ramifications of the invention. It is understood that the terms and proposed shapes used herein are merely descriptive, rather than limiting, and that various changes may be made without departing from the spirit or scope of the invention.

The elements that comprise a dome 41 and an illumination housing base 42 may be made from durable materials such as hard plastics, metal alloys, wood, hard rubbers, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials.

Figure 7:
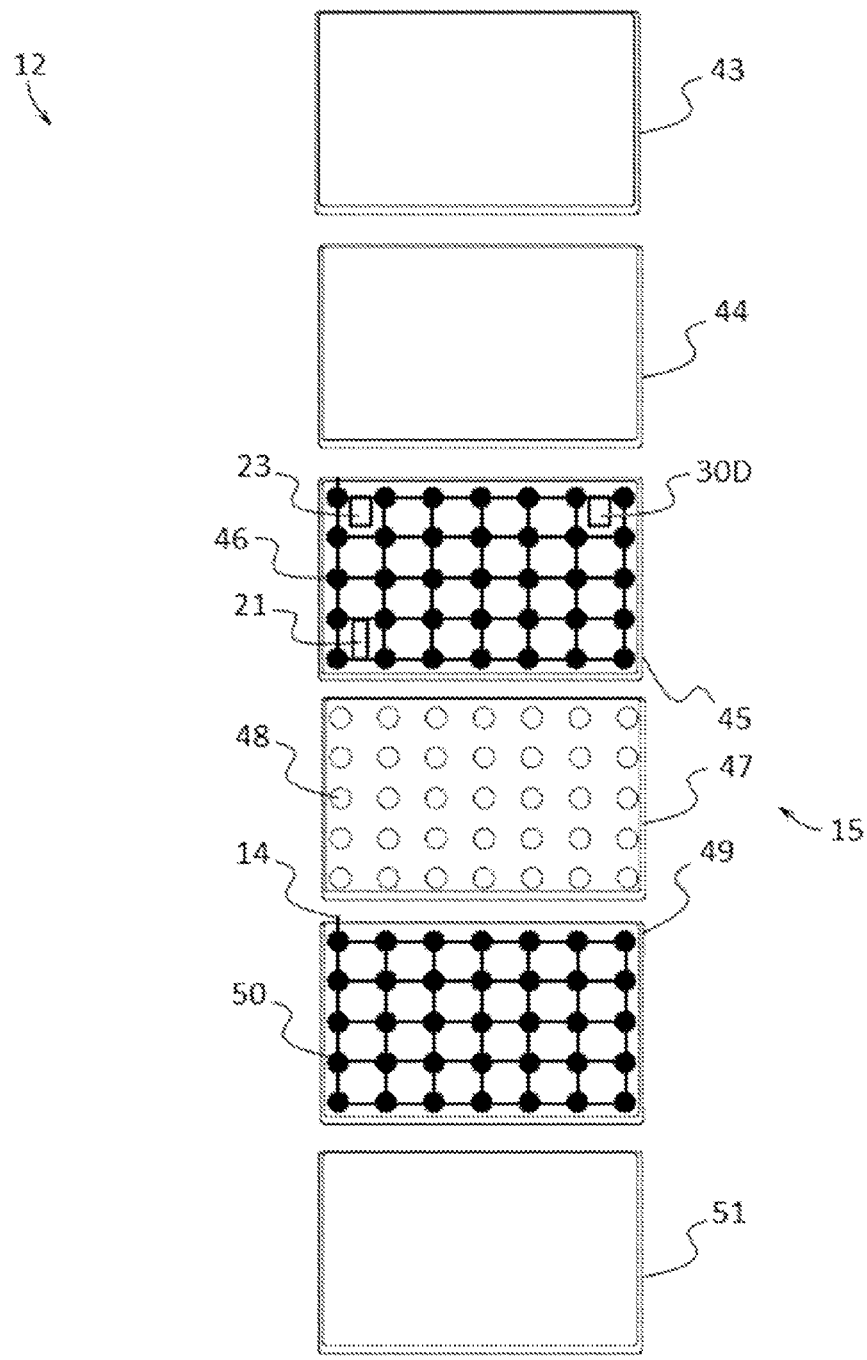
FIG. 7 depicts an exploded perspective view of a pressure mat according to various embodiments described herein.

FIG. 7 depicts an exploded perspective view of a pressure mat 12 according to various embodiments described herein. In some embodiments, a pressure mat 12 may optionally comprise a radio 23 (FIG. 5) and optionally a power source 30D which may be in electrical communication with a radio 23 of an illumination housing 11. In some embodiments, a pressure mat 12 may optionally a power source 30D and optionally comprise a processing unit 21 similar the processing unit 21 depicted in FIG. 5) which may be configured to govern wired or wireless electrical communication between an illumination housing 11 and the pressure mat 12. In this embodiment, the pressure mat 12 comprises a membrane pressure switch 15 that may be used to modulate the light and/or sound produced by the apparatus 100 (FIGS. 1-3). In other embodiments, the pressure mat 12 may comprise any other type of pressure activated switch such as other types of membrane switches, a pressure plate, vacuum switch, traction pad, air pressure switch, capacitive switch, or any other type of pressure activated switch. A membrane switch is an electrical switch for turning a circuit on and off. Typically, a membrane switch is a circuit printed on Polyethylene terephthalate (PET), Indium tin oxide (ITO), or any other similar suitable material. The ink used for printing is usually copper/silver/graphite filled and therefore conductive.

It should be understood to one of ordinary skill in the pressure mat 12 may be configured in a plurality of sizes and shapes including oval shaped, star shaped, square shaped, rectangular shaped, circular shaped, hexagonal shaped, triangular shaped, or any other geometric or non-geometric shape. It is not intended herein to mention all the possible alternatives, equivalent forms or ramifications of the invention. It is understood that the terms and proposed shapes used herein are merely descriptive, rather than limiting, and that various changes may be made without departing from the spirit or scope of the invention.

A membrane pressure switch 15 typically has four or more layers. The top layer of a membrane switch is the interface between the user and the machine. The other critical layer is a printed circuit. This can also be a flex circuit made of copper and polyimide material. The layers are normally assembled using pressure-sensitive adhesives although inexpensive designs can be held together through other mechanical means such as a keyboard housing. In other embodiments, any other type of switch that may detect pressure may be used in the pressure mat 12 to modulate the light and/or sound produced by the apparatus 100 (FIGS. 1-3).

In this exemplary embodiment, the pressure mat 12 comprises a membrane switch which further comprises five layers. The top layer is the presentation layer 43 which may be visible to a user 200 (FIG. 1) and may comprise graphics or indicia. An adhesive layer 44 may be placed between the presentation layer 43 and the upper circuit layer 45. The adhesive layer 44 may be an adhesive such as double coated tape, silicone, polyester, and the like may be applied directly to the presentation layer 43 and/or the upper circuit layer 45. The upper circuit layer 45 may comprise one or more upper contact points 46. The lower circuit layer 49 may similarly comprise one or more lower contact points 50. The upper contact points 46 and lower contact points 50 are conductive and preferably flexible in nature. In some embodiments, the upper contact points 46 and/or lower contact points 50 may also provide tactile feedback. The upper contact points 46 and lower contact points 50 may each be provided electricity by a wired connection with a quick connect and disconnect plug connector 14, and therefore, a wired connection 13 (FIGS. 1-3).

A separation layer 47 may be placed between the upper circuit layer 45 and the lower circuit layer 49. The separation layer 47 may be made from elastic or resilient materials such as soft plastics and rubber. In preferred embodiments, the separation layer 47 comprises a series of holes or apertures 48 that keeps the upper contact points 46 and lower contact points 50 from touching. The separation layer 47 may be made from elastic or resilient materials such as soft plastics and rubber which may be configured to deform once pressure above a desired weight threshold such as one to twenty pounds is placed on the pressure mat 12. When weight above a desired threshold is placed on the pressure mat 12, the separation layer 47 may deform allowing the upper contact points 46 of the upper circuit layer 45 and the lower contact points 50 of the lower circuit layer 49 to come in contact with each other through the apertures 48 thereby completing a circuit which may provide sound and/or illumination. Different thicknesses and levels of deformation resistant materials may be used to provide a pressure or weight threshold for the pressure mat 12. Thicker materials and materials more resistant to deformation may be used in the separation layer 47 for higher thresholds, while thinner materials and materials less resistant to deformation may be used in the separation layer 47 for lower thresholds.

Finally, a bottom adhesion layer 51 may be joined to the presentation layer 43 along their peripheral edges, or the bottom adhesion layer 51 may be joined to any other layer. One or more of the layers of the pressure mat 12 may be joined together by an adhesive such as double coated tape, silicone, PET layer with adhesive around the outer edges, by being integrally formed or molded together, heat bonding, chemical bonding, temporary fasteners such as Velcro or tongue and groove fasteners, or any other suitable joining method.

The elements that comprise the pressure mat 12 may be made from durable materials and flexible materials that are preferably waterproof such as soft plastics, sheet metal alloys, silicone, soft rubbers, polymers, or any other suitable materials including combinations of materials.

Figure 8:
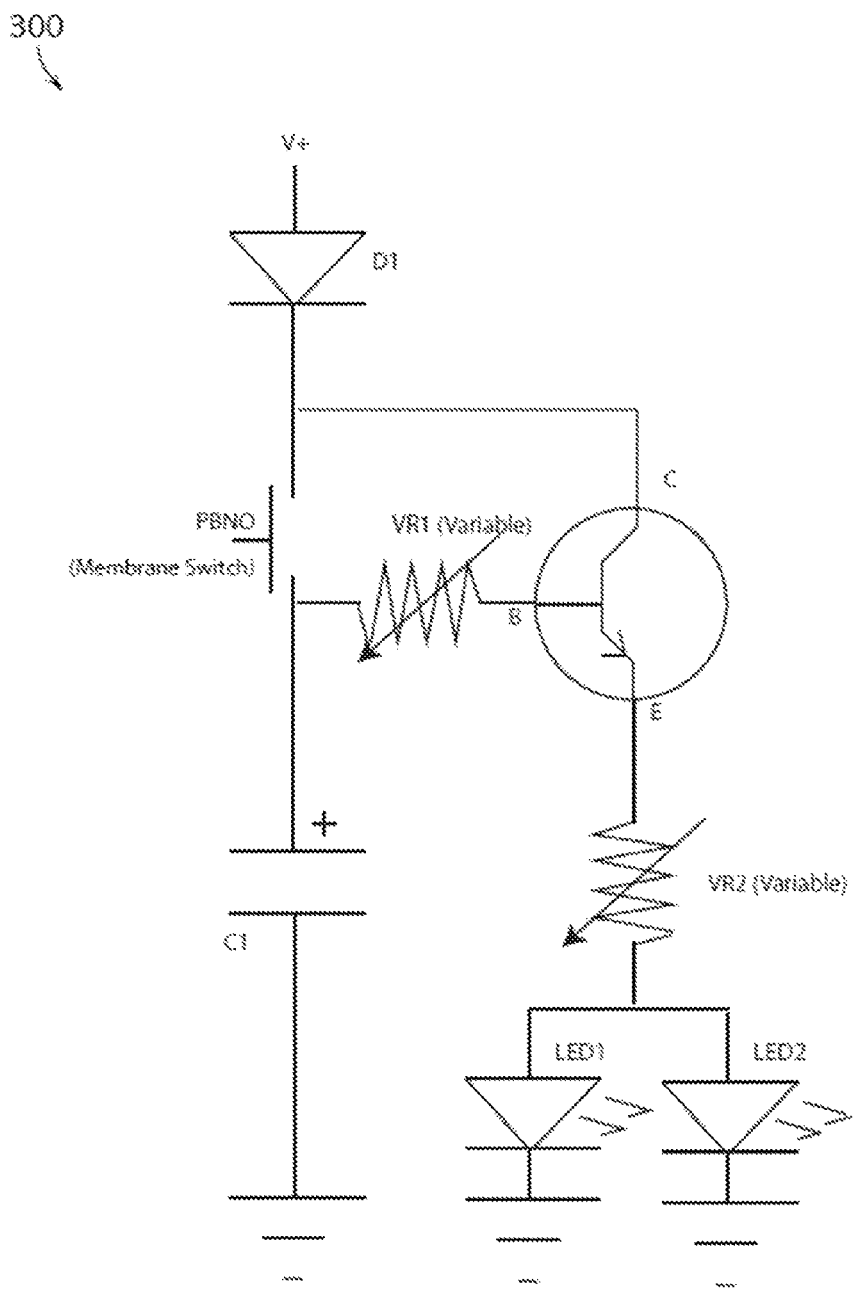
FIG. 8 illustrates an electrical diagram of an example of an illumination circuit according to various embodiments described herein.

FIG. 8 shows an electrical diagram of an example of an illumination circuit 300 according to various embodiments described herein. This schematic diagram shows the components of the circuit as simplified standard symbols and the connections between the components, including power and signal connections. Arrangement of the components interconnections on the diagram does not correspond to their physical locations in the finished apparatus 100 (FIGS. 1-3).

Figure 9:
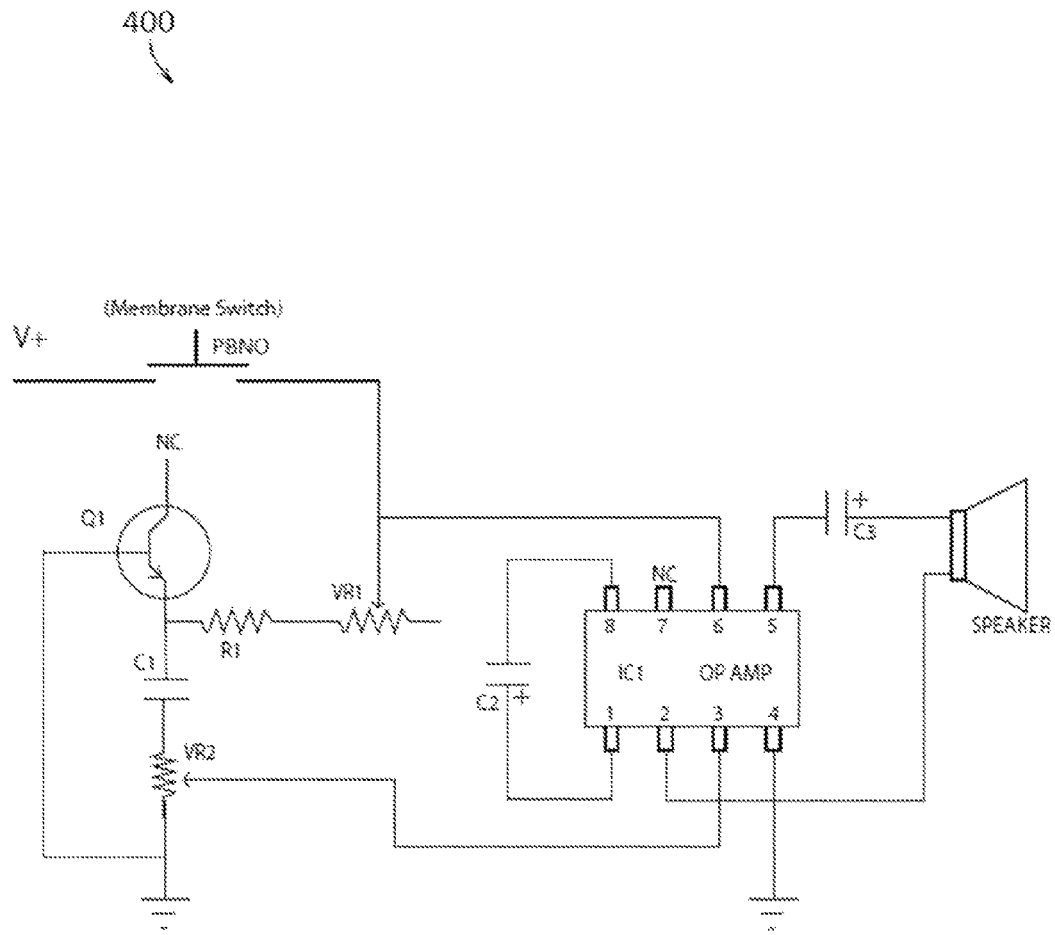
FIG. 9 shows an electrical diagram of an example of a sound circuit according to various embodiments described herein.

FIG. 9 depicts an electrical diagram of an example of a sound circuit 400 according to various embodiments described herein. This schematic diagram shows the components of the circuit as simplified standard symbols and the connections between the components, including power and signal connections. Arrangement of the components interconnections on the diagram does not correspond to their physical locations in the finished apparatus 100 (FIGS. 1-3).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A pressure activated illumination apparatus, the apparatus comprising:
   a pressure mat positioned at a first location, wherein the pressure mat comprises a pressure membrane switch having a top presentation layer, an upper circuit layer, lower circuit layer, and a separation layer positioned between the upper circuit layer and the lower circuit layer;
   an illumination housing positioned at a second location spaced apart and separate from the pressure mat, wherein the illumination housing comprises a light emitting elements configured to illuminate the second location independently of illumination the first location;
   a user control input configured to modulate the illumination of the light emitting element; and
   wherein the pressure mat is in communication with the illumination housing, and wherein the light emitting element of the illumination housing is configured to illuminate the second location upon receiving communication from the pressure mat.

2. The apparatus of claim 1, wherein the pressure mat is configured to send an electrical communication to the illumination housing once a weight above a desired threshold is placed on the pressure mat.

3. The apparatus of claim 1, wherein the light emitting element is configured to illuminate for a period of time after the illumination housing receives an electrical communication from the pressure mat.

4. The apparatus of claim 3, wherein the user control input is positioned on the illumination housing and configured to modulate the period of time that the light emitting element illuminates once the illumination housing receives an electrical communication from the pressure mat.

5. The apparatus of claim 3, wherein the wireless electrical communication between the pressure mat and the illumination housing is provided by a Bluetooth communication protocol.

6. The apparatus of claim 5, wherein the speaker is configured to produce sound for a period of time after the illumination housing receives an electrical communication from the pressure mat.

7. The apparatus of claim 5, wherein the user control input is configured to modulate the period of time that the speaker produces sound once the illumination housing receives an electrical communication from the pressure mat.

8. The apparatus of claim 3, wherein the wireless electrical communication between the pressure mat and the illumination housing is provided by a WiFi communication protocol.

9. The apparatus of claim 1, wherein the pressure mat and illumination housing each comprise a radio, and wherein the pressure mat is in wireless electrical communication with the illumination housing.

10. The apparatus of claim 1, wherein the illumination housing comprises a speaker that is configured to produce sound upon the illumination housing receiving an electrical communication from the pressure mat.

11. The apparatus of claim 1, further comprising a wired connection configured to provide electrical communication between the illumination housing and the pressure mat.

12. The apparatus of claim 11, wherein the wired connection comprises a quick connect and disconnect plug connector and the wire of the wired connection has a length greater than a length of the pressure mat allowing the illumination housing to be spaced apart at a distance from the pressure mat.

13. A pressure activated illumination apparatus, the apparatus comprising:
a pressure mat positioned at a first location, wherein the pressure mat comprises a pressure membrane switch having a top presentation layer, an upper circuit layer, lower circuit layer, and a separation layer positioned between the upper circuit layer and the lower circuit layer and adapted so that the upper circuit layer makes electrical contact with the lower circuit layer upon receiving weight above a first threshold, said weight pushing down upon the top presentation layer and the upper circuit layer;
an illumination housing positioned at a second location spaced apart and separate from the pressure mat, wherein the illumination housing comprises a light emitting element configured to illuminate a toilet at the second location;
a user control input configured to modulate the illumination of the light emitting element; and
wherein the pressure mat is in communication with the illumination housing, and wherein the light emitting element of the illumination housing is configured to illuminate the second location upon receiving communication from the pressure mat.

14. The apparatus of claim 13, wherein the separation layer deforms a first distance upon receiving a first weight onto the top presentation layer and deforms a second distance upon receiving a second weight onto the top presentation layer.

15. The apparatus of claim 14, wherein the second distance is greater than the first distance causing the upper circuit layer to come into electrical communication with the lower circuit layer thereby activating the light emitting element of the illumination housing while the second distance does not cause the upper circuit layer to come into electrical communication with the lower circuit layer thereby not activating the light emitting element of the illumination housing.

16. The apparatus of claim 13, wherein the illumination housing at the second location further comprises a control input, a power source, a processing unit, and a speaker.

17. The apparatus of claim 13, wherein the pressure mat and illumination housing are connected by a wire with a length greater than a length of the pressure mat thereby allowing the illumination housing to be placed apart from the pressure mat so that the light emitting element may illuminate said second location while not illuminating said first location.

18. The apparatus of claim 13, wherein the pressure mat and illumination housing each comprise a radio, and wherein the pressure mat is in wireless electrical communication with the illumination housing.

* * * * *